March 27, 1962  A. GAUTIER ET AL  3,026,709
CREEP TESTING MACHINES
Filed Aug. 16, 1957  2 Sheets-Sheet 1
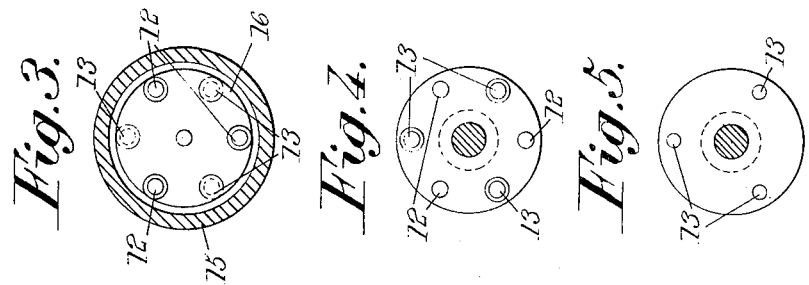
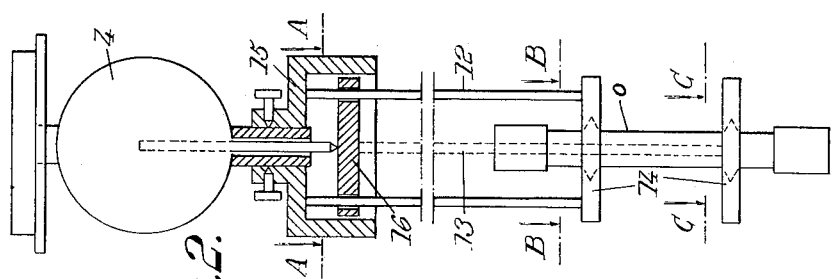
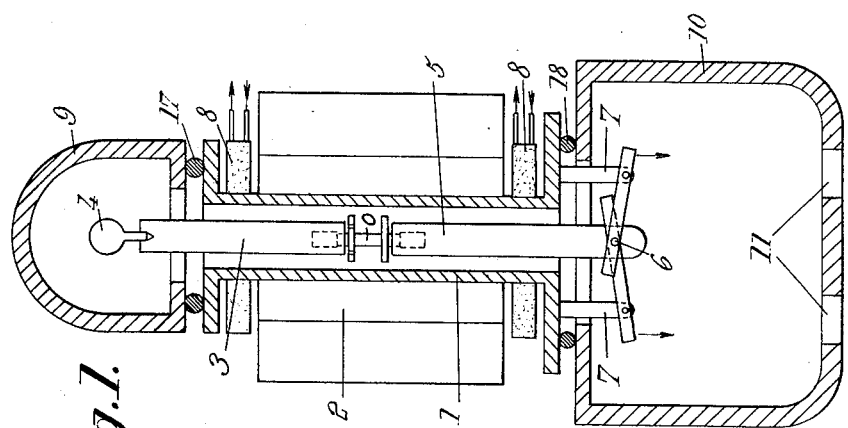
INVENTOR
BY
ATTORNEY

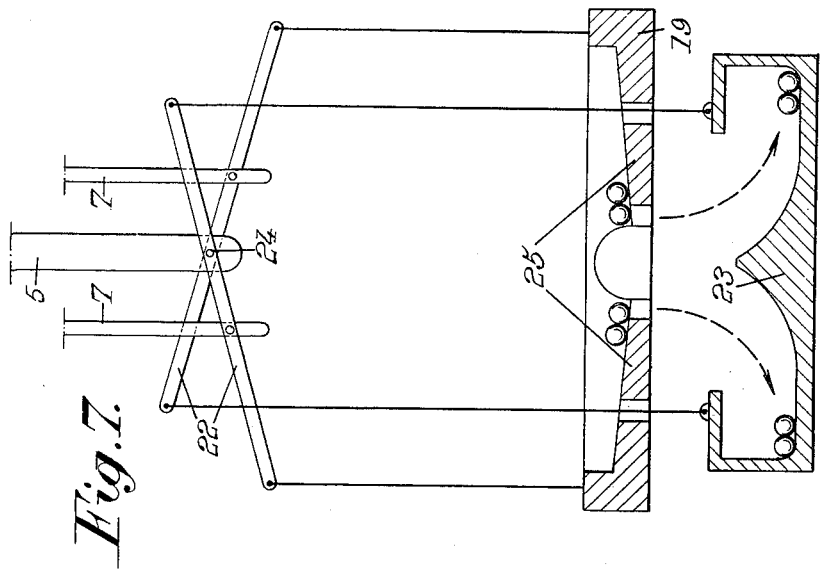
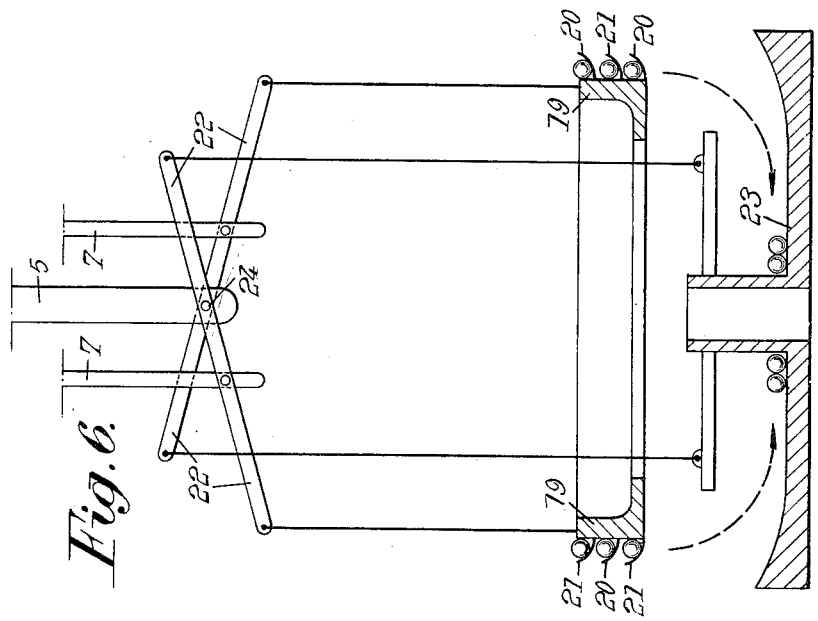

United States Patent Office 3,026,709
Patented Mar. 27, 1962

3,026,709
CREEP TESTING MACHINES
André Gautier, Clamart, and Olivier Pommellet, Paris, France, assignors to Commissariat a l'Energie Atomique, Paris, France, a French state administration
Filed Aug. 16, 1957, Ser. No. 678,572
Claims priority, application France Aug. 30, 1956
3 Claims. (Cl. 73—15.6)

The present invention relates to testing machines for measuring the creep of materials, that is to say their deformations at constant temperatures as a function of time, under low stresses which may vary in time. The invention is more especially but not exclusively concerned with machines for testing the creep of metals or alloys which are easily oxidizable at the temperature at which they are tested.

The chief object of this invention is to provide a machine of this kind which permits of performing the desired test under a high vacuum, of applying the load to the test piece after the temperature thereof has become stable and of applying on said test piece stresses of low and accurate values.

The invention is essentially characterized in that it comprises means forming a high vacuum chamber, means for maintaining in at least a portion of this chamber a temperature distributed in homogeneous fashion and, inside said chamber, in addition to the test piece the deformation of which is to be measured, differential extensometric means for indicating the deformations of the test piece and means operative from the outside of said chamber for applying small stresses, preferably adjustable, to said test piece.

It should be reminded that measurement of the creep of some metals and alloys, such as those which are easily oxidized at the temperature at which the tests are conducted, requires, under the usual experimentation conditions, creep testing machines capable of complying with all of the following conditions:

A high vacuum, for instance of $10^{-5}$ mm. of mercury (the use of an inert atmosphere would facilitate the production of convection currents, detrimental to a good distribution of the temperature, and such an asmosphere would have to be frequently purified);

Application of the load after the temperature has become stable;

High sensitivity;

Possibility of applying a low stress to the test piece (for instance 10 grams);

Long duration of the test (for instance 3,000 hours).

Some creep testing machines have been built to comply with some of these conditions. Some of these machines permit of obtaining a good vacuum but they do not permit of applying the load after the test piece has been heated up, nor of applying low stresses. Other machines permit of applying the load after the test piece has been heated up but they do not permit of obtaining the desired vacuum. Another known machine permits of obtaining a vacuum which is acceptable and of applying low stresses but the load is applied before the test piece has been heated up and the sensitvity is not sufficient.

In order to obviate this drawback, we make use, according to the present invention, of a combination of means (for applying the load to the test piece and measuring its deformations) which have a high sensitivity and can be housed in a common chamber where a high vacuum can be produced and in at least a portion of which may be maintained a temperature distributed in a homogeneous fashion and without variation, all these means being operable from the outside of said chamber.

In a preferred embodiment of the machine according to our invention, a homogeneous distribution of the temperature in the heated space is obtained by creating two cold areas at the ends of the heating zone. These cold areas constitute an obstacle to heat losses by conductivity in the machine, which losses are very important in the case of an apparatus working under vacuum. They permit of stabilizing the temperature gradient in time and space and this the more efficiently as the heating temperature is higher.

The deformations of the test piece are measured by a differential extensometric device which eliminates parasitic deformations and transmits only the deformations of the piece itself to the measurement apparatus. This extensometric device may be constituted by two sets of pure quartz rods. These sets of rods are interposed between on the one hand the reference points of the test-piece, through removable plates, and on the other hand the relatively movable parts of the measurement apparatus. Furthermore, a compensated spring exerting an upward force equal to the weight of the measurement apparatus prevents the latter from weighing upon the test piece.

The load is applied on the test piece on the inside of the vacuum chamber, after heating up of the test piece, by means of a system of plates and levers constituting a differential balance arranged to be controlled from the outside of the vacuum chamber. One of the plates, called "negative plate," contains a load constituted by balls. It is hanging from the ends of two levers hinged about fixed pivots. The other end of these levers supports a plate called "positive plate" which will receive the balls from the negative plate to apply the load to the test piece.

As soon as a ball passes from the negative plate to the positive plate, the equilibrium of the balance is destroyed and the resultant stress is applied to the lower fixation head of the test piece with which the two levers are connected.

Preferred embodiments of our invention will be hereinafter described with reference to the accompanying drawings given merely by way of example and in which:

FIG. 1 diagrammatically shows in vertical axial section a creep testing machine according to the invention, the extensometric means and the load applying means being not shown on this figure, since said means are illustrated by the following figures.

FIG. 2 diagrammatically shows in axial section the extensometric means of the machine.

FIGS. 3, 4 and 5 are sectional views on the lines AA, BB, and CC of FIG. 2.

FIGS. 6 and 7 diagrammatically show, in axial section, two different embodiments of the load applying means of the machine.

The machine is of the vertical type, the stress applied to the test piece O being directed downwardly. It essentially comprises the following elements (reference is made to FIG. 1):

A stainless steel tube 1 located in the muffle of an electric furnace 2 regulated automatically in a suitable manner for instance by means of an expansible wire;

A pair of fixation heads of refractory steel intended to keep the test piece in position and including a fixed upper head 3 which supports a comparator 4 and a lower head 5 which is to be coupled with the load applying system 6 hinged to the fixation members 7 rigid with tube 1;

An extensometric device including a comparator and means for transmitting the deformations thereto as shown in detail on FIGS. 2 to 5;

A pyrometric rod of silica for controlling the temperature (not shown);

An upper bell-shaped cover 9 provided on one of its sides with a window capable of resisting the effect of vacuum, so as to permit of reading the indication of comparator 4, and with a vacuum gauge (not shown);

A lower bell-shaped chamber 10, surrounding the load applying device (which is only partly shown on FIG. 1 and more specifically illustrated in FIGS. 6 and 7) provided with apertures 11 for communication with the pumping means (not shown);

Two water-jackets 8 parallel to the ends of the furnace and in direct contact with tube 1, in order to permit homogenization of the heating zone and also to protect the vacuum packing means 17 and 18 interposed between tube 1 and chambers 9 and 10.

The extensometric device shown by FIG. 2, in a preferred but not limited form, is of the differential type, that is to say eliminates any parasitic displacement and transmits to the measurement apparatus only the deformations of the test piece itself.

It is essentially constituted by two sets 12 and 13 of pure quartz rods. Each set, located at 60° to the other about the vertical axis includes three rods angularly spaced at 120° from one another about said axis. Each of said sets bears upon one of the two removable collars or plates 14 secured to the test piece at the points chosen for reference. The set of rods 12 bears upon the upper plate 14 and the set of rods 13 upon the lower plate 14.

Rods 12 act directly upon the support of the comparator 4 through the base 15 thereof. Rods 13 act directly upon the rod of the comparator through a sliding plate 16.

The load applying device shown by FIG. 6 in its preferred embodiment includes two plates forming a differential balance, the load of one of these plates passing onto the other at the desired time and at suitable time intervals. The "negative plate" 19 carries two helical guiding channels 20 and 21, superimposed on each other, in which a multiplicity of balls corresponding to the weight to be applied are stored. This plate is hanging from the outer ends of two levers 22 pivoted to fixed members 7. The other ends of these levers support the "positive plate" 23 which receives, one by one, the balls from the negative plate.

Before a test, and after the balls have been stored on the negative plate, the positive plate is loaded so that the balance is in perfect equilibrium.

After the temperature has been stabilized, the balls are released, one by one, by means of two electromagnets (not shown) located at the bottom of each helical guiding channel. A device for transmitting impulses makes it possible to operate each channel alternately and also to adjust the time at which the balls are released.

In an example of application of our machine, tests were made with balls weighing 10 grams, the lower arms of elements 22 being in the ratio of 1 to 5, so that the load applied by every ball was 50 grams.

During these tests, we obtained the following results:

Value of the vacuum measured by means of a conventional vacuum gauge—from $10^{-5}$ to $5.10^{-5}$ mm. of mercury at a temperature of 600° C.;

Temperature gradient in the heating zone (with reference to the center of the test piece kept at 500° C.):

Vertical gradient— °C.
   At the center of the test piece _____ 500
   100 mm. above _____ 491
   100 mm. below _____ 495
Horizontal gradient—
   At the center of the test piece _____ 500
   25 mm. on the left _____ 505
   25 mm. on the right _____ 502

Measurable creep rate—$0.6 \times 10^{-4}$ percent per hour;
Rate of application of the load—4 rates are possible, to wit:

One ball every second,
One ball every two seconds,
One ball every five seconds,
One ball every ten seconds.

Thus, the time necessary for applying the whole load may vary from 150 to 300 seconds for stresses ranging from 10 grams per sq./mm. to 1 kilogram per sq./mm.;

Capacity of the balance for applying the load: 250 balls of 10 grams, that is to say a maximum load of 12.5 kilograms;

Dimensions of the test pieces: in order to give a maximum sensitivity, three dimensions were used:

|  | Diameter of the body, mm. | Diameter of the head, mm. | Useful length, mm. |
| --- | --- | --- | --- |
| Type I (for high stresses) | 4 | 7 | 30 |
| Type II (for medium stresses) | 7 | 12 | 50 |
| Type III (for low stresses) | 10 | 16 | 80 |

In a modification illustrated by FIG. 7, the helical grooves are replaced by two sloping circular sectors 25, the balls being in this case dropped near the center of the negative plate 19. Such a construction is more advantageous because it is easier to obtain and more accurate in operation.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A creep testing machine which comprises, in combination, fixed vessel means enclosing a high vacuum space, said space including a central chamber and two end chambers in direct communication with said central chamber, heating means surrounding said central chamber for maintaining the middle portion thereof at a uniform high temperature, means for holding one end of a test piece in fixed position in said central chamber, an extensometric device in one of said end chambers, said device having a part fixed with respect to said end chamber and a part movable with respect thereto, means for operatively connecting said movable part with the other end of said test piece, said connecting means being substantially out of frictional contact with said vessel means, cooling means surrounding the portion of said vessel means that connects said last mentioned end chamber and said central chamber so as to prevent heat propagation between said central chamber and said last mentioned end chamber, and means located in the other of said end chambers and operative from the outside of said space for exerting a load on said test piece, said last mentioned means being operatively connected with said second mentioned end of said test-piece.

2. A creep testing machine which comprises, in combination, a vertical tubular casing, a bell-shaped cover mounted at the top of said casing, in communication therewith, an annular packing member between the top end of said casing and the edge of said cover, an inverted bell-shaped chamber at the lower end of said casing in communication therewith, an annular packing member between the lower end of said casing and the edge of said chamber, said casing, said cover and said chamber together with said packing member forming a high vacuum closed space, heating means surrounding said casing for maintaining the middle portion thereof at a uniform high temperature, means for holding one end of a test piece in fixed position in said middle portion of the casing, an extensometric device in said cover, said device having one part fixed with respect to said cover and one part movable with respect thereto, means for operatively connecting said movable part with the other end of said test piece, said connecting means being substantially out of frictional contact with said casing and said cover, cooling means surrounding the top and bottom ends of said casing so as to protect said packing members and to prevent heat propagation between said casing and said cover and between said casing and said chamber, loading means located in said chamber and operative from the outside of said space, and load transmitting means interposed between said loading means and said second mentioned end of said test piece, said load transmitting means being out of contact with the walls of said casing and said chamber.

3. A machine according to claim 2 in which said loading means comprise two containers located one above the other, lever means pivoted with respect to said chamber for connecting said two containers with said load transmitting means so that the weight of the upper container urges said load transmitting means upwardly and the weight of the lower container urges said load transmitting means downwardly, and a plurality of balls adapted to drop from said upper container on said lower container, the respective actions of said containers on said load transmitting means balancing each other when said balls are carried by said upper container.

References Cited in the file of this patent

UNITED STATES PATENTS

| | | |
|---|---|---|
| 771,125 | Cash | Sept. 27, 1904 |
| 2,154,280 | Nadai et al. | Apr. 11, 1939 |
| 2,375,034 | Semchyshen | May 1, 1945 |
| 2,685,195 | Streblow | Aug. 3, 1954 |
| 2,748,597 | Kooistra | June 5, 1956 |

FOREIGN PATENTS

| | | |
|---|---|---|
| 692,374 | Germany | June 19, 1940 |
| 824,267 | Germany | Dec. 10, 1951 |